United States Patent [19]
Kaneko et al.

[11] Patent Number: 5,463,606
[45] Date of Patent: Oct. 31, 1995

[54] OPTICAL INFORMATION READING AND REPRODUCING APPARATUS USING PSEUDO DC-FREE CODES

[75] Inventors: Nobuyuki Kaneko; Wataru Katsuhara, both of Tokyo, Japan

[73] Assignee: Olympus Optical Co., Ltd., Japan

[21] Appl. No.: 165,093

[22] Filed: Dec. 10, 1993

[30] Foreign Application Priority Data

Dec. 22, 1992 [JP] Japan ................................. 4-342750
Jan. 8, 1993 [JP] Japan ................................. 5-002118

[51] Int. Cl.⁶ ................................................. H04N 5/76
[52] U.S. Cl. ................................................. 369/59
[58] Field of Search ...................... 369/59, 53, 54; 360/48, 32, 51, 40, 59, 48, 46, 40

[56] References Cited

U.S. PATENT DOCUMENTS

| | | | |
|---|---|---|---|
| 4,835,759 | 5/1989 | Saito et al. | 369/59 |
| 5,122,912 | 6/1992 | Kanota et al. | 360/46 |
| 5,229,986 | 7/1993 | Mizokami et al. | 369/59 |
| 5,233,589 | 8/1993 | Saito et al. | 369/59 |
| 5,233,592 | 8/1993 | Suzuki et al. | 369/59 |
| 5,278,815 | 1/1994 | Mashimo et al. | 369/59 X |
| 5,321,672 | 6/1994 | Miyamoto et al. | 369/59 X |

FOREIGN PATENT DOCUMENTS 61-45470 3/1986 Japan ...................................... 369/53

Primary Examiner—Donald Hajec
Assistant Examiner—Thien Minh Le
Attorney, Agent, or Firm—Laff, Whitesel, Conte & Saret, Ltd.

[57] ABSTRACT

An optical information recording and reproducing apparatus includes a random information generating section for generating predetermined random information. A recording information generating section generates recording information on the basis of non-DC-free information and the predetermined random information. A synchronization sensing section senses a synchronization information. A recording section records the recording information in the recording area of a recording medium, on the basis of the synchronization information. A reproducing section reproduces the recording information recorded by the recording section.

8 Claims, 8 Drawing Sheets

OPTICAL DISK RECORDING & REPRODUCING APPARATUS 1

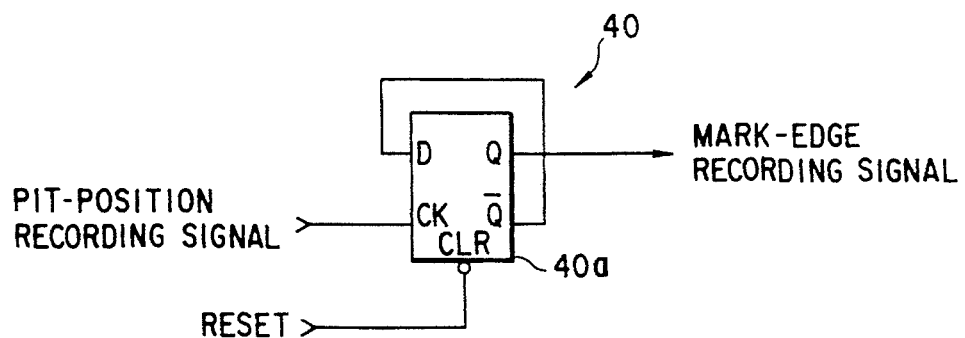
FIG. 2A
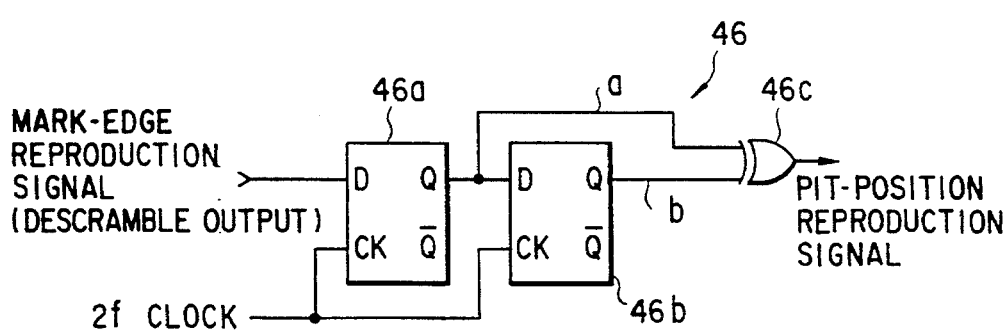
FIG. 2B
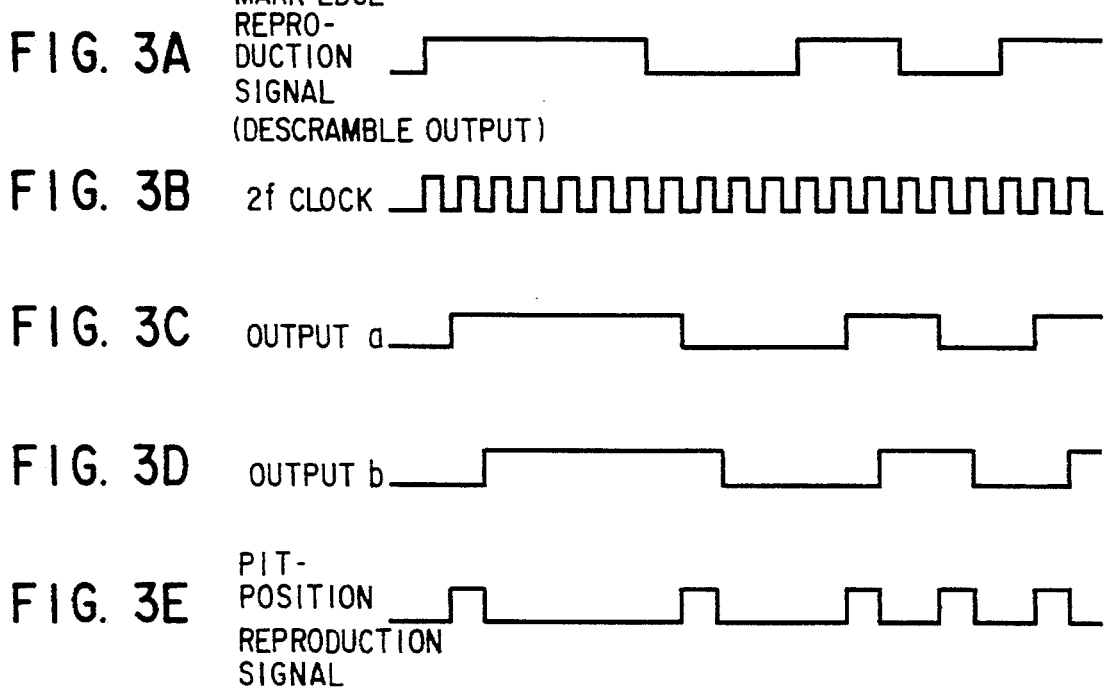
FIG. 3A  MARK-EDGE REPRODUCTION SIGNAL (DESCRAMBLE OUTPUT)
FIG. 3B  2f CLOCK
FIG. 3C  OUTPUT a
FIG. 3D  OUTPUT b
FIG. 3E  PIT-POSITION REPRODUCTION SIGNAL

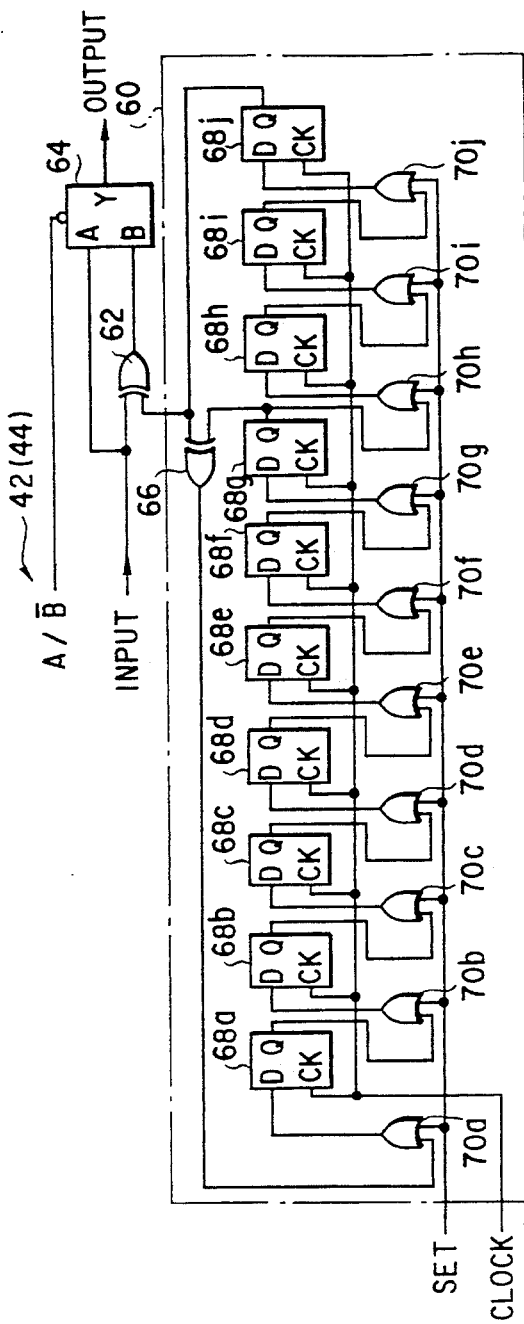
F I G. 6
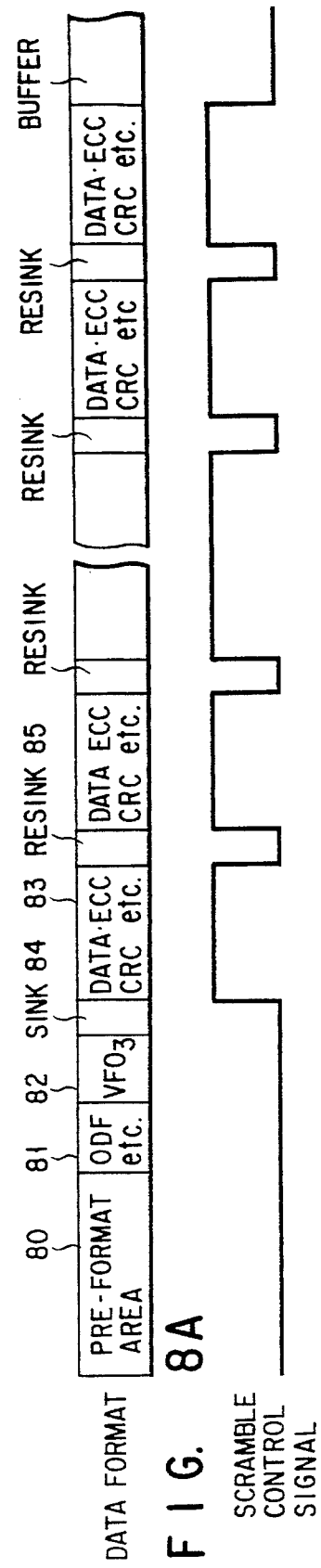
F I G. 8A
F I G. 8B

FIG. 11A PRIOR ART  2-7 MODURATION CODE  0 0 0 1 0 0 0 0 0 0 1 0 0 0 0 1 0 0 1 0 0 1 0 0

FIG. 11B PRIOR ART  PIT-POSITION RECORDING SIGNAL

FIG. 11C PRIOR ART  PIT-POSITION RECORDING PIT

FIG. 11D PRIOR ART  MARK-EDGE RECORDING SIGNAL

FIG. 11E PRIOR ART  MARK-EDGE RECORDING PIT

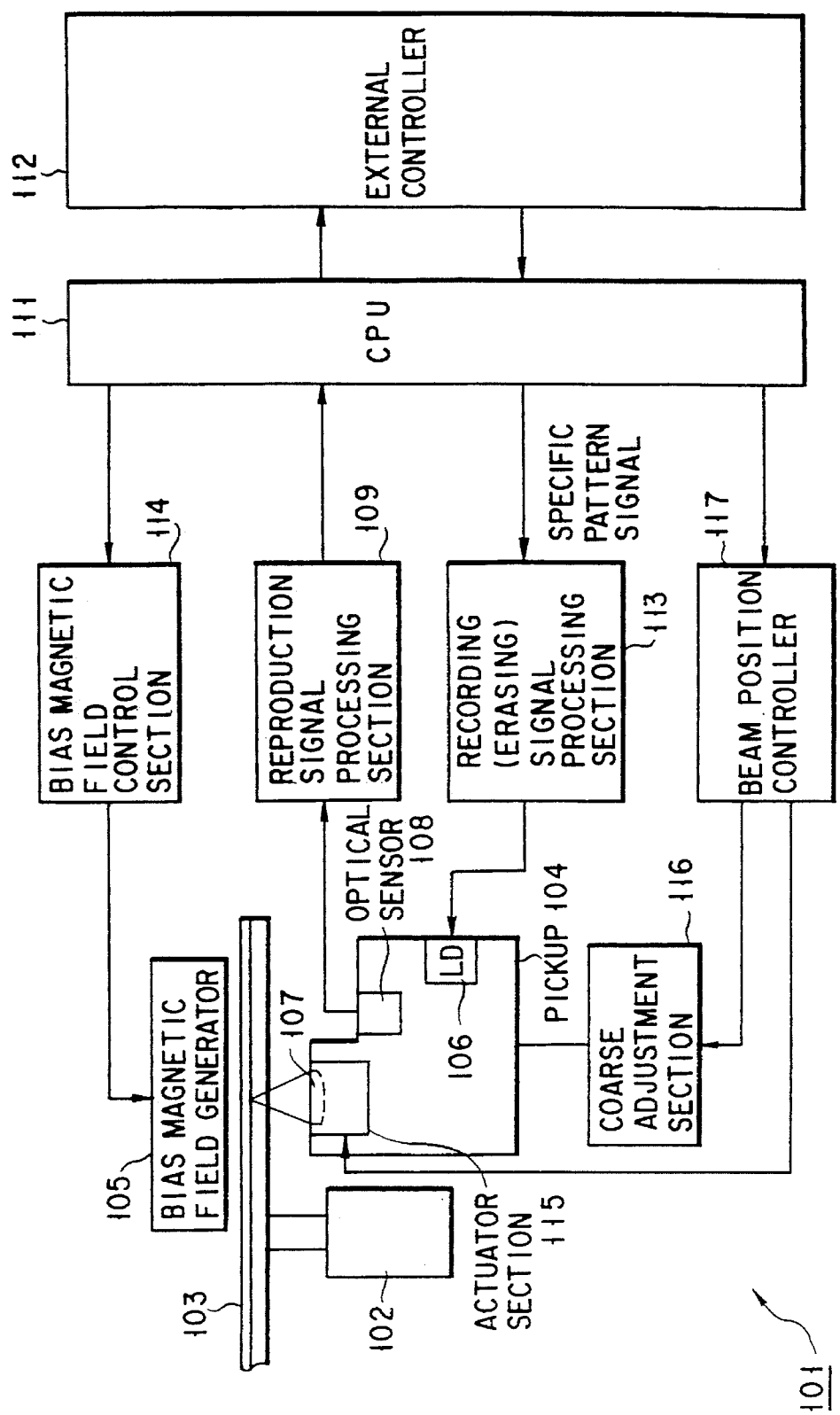
F I G. 12

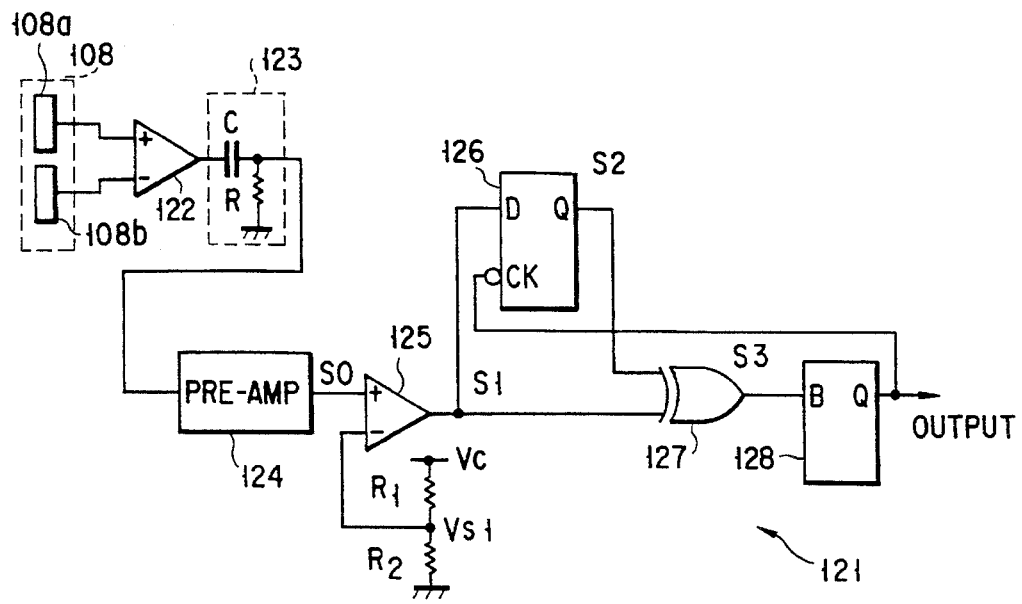
F I G. 13
FIG. 14A TRACK
FIG. 14B S0
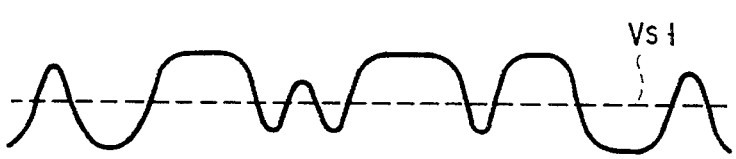
FIG. 14C S1
FIG. 14D S2
FIG. 14E S3
FIG. 14F OUTPUT

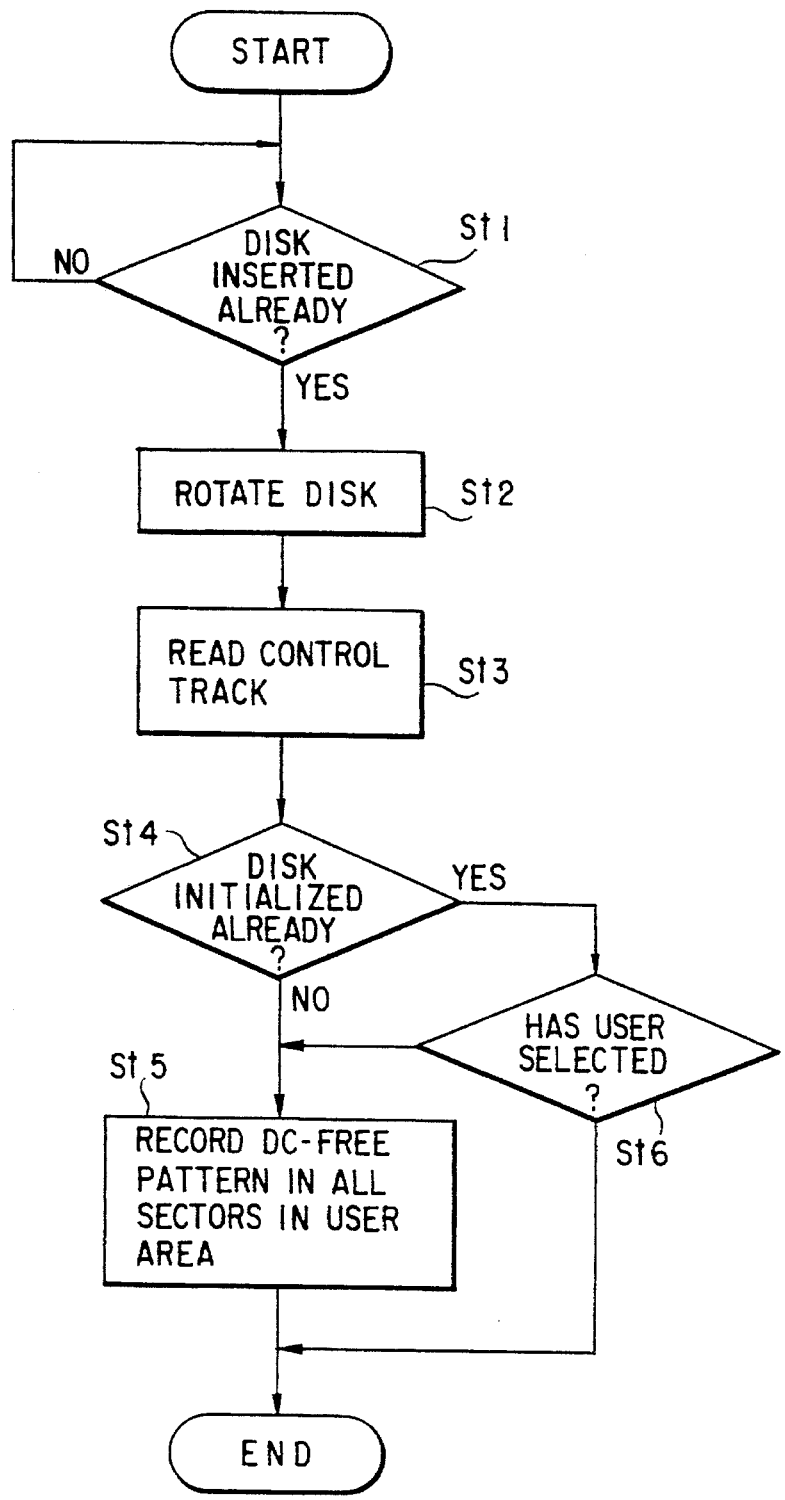
F I G. 15

OPTICAL INFORMATION READING AND REPRODUCING APPARATUS USING PSEUDO DC-FREE CODES

BACKGROUND OF THE INVENTION

1. Field of the Invention

This invention relates to an optical information reading and reproducing apparatus which records and reproduces onto and from an optical information recording medium pseudo DC free codes generated on the basis of non-DC-free code information.

2. Description of the Related Art

Various methods of recording information onto an optical information recording medium such as an optical disk have been proposed.

For example, the existing optical information recording and reproducing apparatuses using 130-mm or 90-mm ISO standardized optical disks have been using a method of recording information onto an optical information recording medium by assigning information to the distance between pits by pit-position recording techniques. To double the memory capacity of the 130-mm ISO standardized optical disk, a second-generation optical information recording and reproducing apparatus has been proposed which employs the MCAV system that records information at almost equal recording density from the innermost to the outermost circumference. Even the second-generation optical information recording and reproducing apparatus uses a method of recording information onto an optical information recording medium by assigning information to the distance between pits by pit-position recording techniques.

In contrast, to triple the memory capacity of optical disks, mark-edge recording techniques have been proposed which assign information to the length of the pit, since it is difficult to increase the recording density by pit-position recording techniques.

With pit-position techniques, information exists between peak points of the reproduced signal from the recording medium. Thus, by obtaining the first-order 10 differential of the reproduced signal and then slicing its zero-crossing point, the information can be reproduced. Specifically, even when the recording information is modulated in 2–7 modulation codes, not DC-free codes, as shown in FIG. 11A, the resulting pit-position recording signal is a signal corresponding to "0" and "1" in the 2–7 modulation code system, as shown in FIG. 11B. Thus, the pit-position recording pits are formed as shown in FIG. 11C, which therefore introduces no problem to the reproduction of information at all.

In the case of mark-edge recording techniques proposed to increase the recording density, however, the resulting mark-edge recording signal is a signal corresponding to the change from "0" to "1" in the 2–7 modulation code system, so that the mark-edge recording pits are as shown in FIG. 11E. Specifically, because information is assigned to the distance between edges of the reproduced signal from the recording medium, accurate reproduction of information from the reproduced signal from the recording medium can be achieved by obtaining the second-order differential of the reproduced signal and then slicing its zero-crossing point. The second-order differential technique wherein the reproduced signal is passed through a differentiator twice has an S/N disadvantage in that it amplifies noises in high-frequency bands.

A level-slicing method as disclosed in Jpn. Pat. Appln. KOKAI Publication No. 61-45470 can be considered to be another method of reproducing the information recorded by mark-edge recording techniques. In this case, when recording information is modulated in 2–7 or 1–7 modulation codes, not DC-free codes, the level-slicing method cannot accurately sense the edges of the reproduced signal from the recording medium, since the slicing level varies with the pattern of the reproduced signal due to AC coupling in the reproduction system.

To overcome this drawback, there has been proposed a method which, in the case of optical disks complying with a proposal for 130-mm ECMA standardization (ECMA/TC31/92/36) using a method of recording by assigning information to the length of the pit by mark-edge recording techniques, obtains the DSV (digital sum value) of 1s and 0s of the recording pits in the data portion before and after the resink pattern of the data area on the optical disk (i.e., obtaining the sum of 1s and that of 0s), and selecting and recording two types of resink patterns, depending on whether the number of 1s is larger than that of 0s. Then, the polarity of the recording pattern in the following data section is reversed to form a pseudo DC-free code, which is then recorded. In a reproducing operation, the two types of resink patterns are sensed and it is judged whether the following data is reversed or not. Then, the signal is further processed to reproduce the data.

In the proposal for 130 mm ECMA standardization, recording patterns are converted into pseudo DC-free codes on the basis of two types of sink patterns. However, it is virtually difficult to convert the recording data pattern into DC free codes on the basis of only two types of sink patterns. As a result, there is no guarantee that the DSV of 1s will be equal to the DSV of 0s. Therefore, it is impossible to basically overcome the problem encountered when a method of modulating recording information is not based on DC-free codes.

SUMMARY OF THE INVENTION

Accordingly, the object of the present invention is to provide an optical information recording and reproducing apparatus and an optical information reproducing apparatus which enable the high-density recording and reproducing of information by creating recording information on the basis of non-DC free information and random information.

The foregoing object is accomplished by providing an optical information recording and reproducing apparatus which, on the basis of non-DC-free information, records information on a recording medium, the recording medium having a synchronization area in which synchronization information is recorded and a recording area for recording information, comprising: random information generating means for generating predetermined random information; recording information generating means for generating recording information on the basis of the non-DC-free information and the predetermined random information from the random information generating means; synchronization sensing means for sensing the synchronization information recorded in the synchronization area; recording means for recording the recording information from the recording information generating means in the recording area on the basis of the synchronization information sensed by the synchronization sensing means; and reproducing means for reproducing the recording information recorded by the recording means.

The foregoing object is also accomplished by providing an optical information reproducing apparatus which reproduces information from a recording medium having a synchronization area in which synchronization information is recorded and a recording area in which recording information generated on the basis of non-DC-free information and predetermined random information is recorded, comprising: reproducing means for reproducing the recording information recorded in the recording area; and reproduction information generating means for generating reproduction information on the basis of the recording information reproduced by the reproducing means and the predetermined random information.

BRIEF DESCRIPTION OF THE DRAWINGS

The accompanying drawings, which are incorporated in and constitute a part of the specification, illustrate presently preferred embodiments of the invention and together with the general description given above and the detailed description of the preferred embodiments given below, serve to explain the principles of the invention.

FIGS. 2A and 2B are circuit diagrams of the pit-position/mark-edge converting circuit and the mark-edge/pit-position converting circuit of FIG. 1, respectively;

FIGS. 3A through 3E are timing charts for explaining the operation of the mark-edge/pit-position converting circuit of FIG. 2;

FIG. 6 is a circuit diagram of the scramble circuit and the descramble circuit of FIG. 1;

FIGS. 8A and 8B are timing charts for explaining the operation of the scramble/descramble control circuit of FIG. 1;

FIGS. 11A through 11E are explanatory diagrams for pit-position and mark-edge recording techniques;

FIG. 12 is a schematic diagram of a magneto-optical disk apparatus according to a second embodiment of the present invention;

FIG. 13 is a circuit diagram of the edge sensing circuit of the reproduction signal processing section of FIG. 12;

FIGS. 14A through 14F are explanatory diagrams for the signal waveform of each portion in FIG. 13; and FIG. 15 is a flowchart for the operation of the second embodiment.

DETAILED DESCRIPTION OF THE PREFERRED EMBODIMENTS

Figure 1:
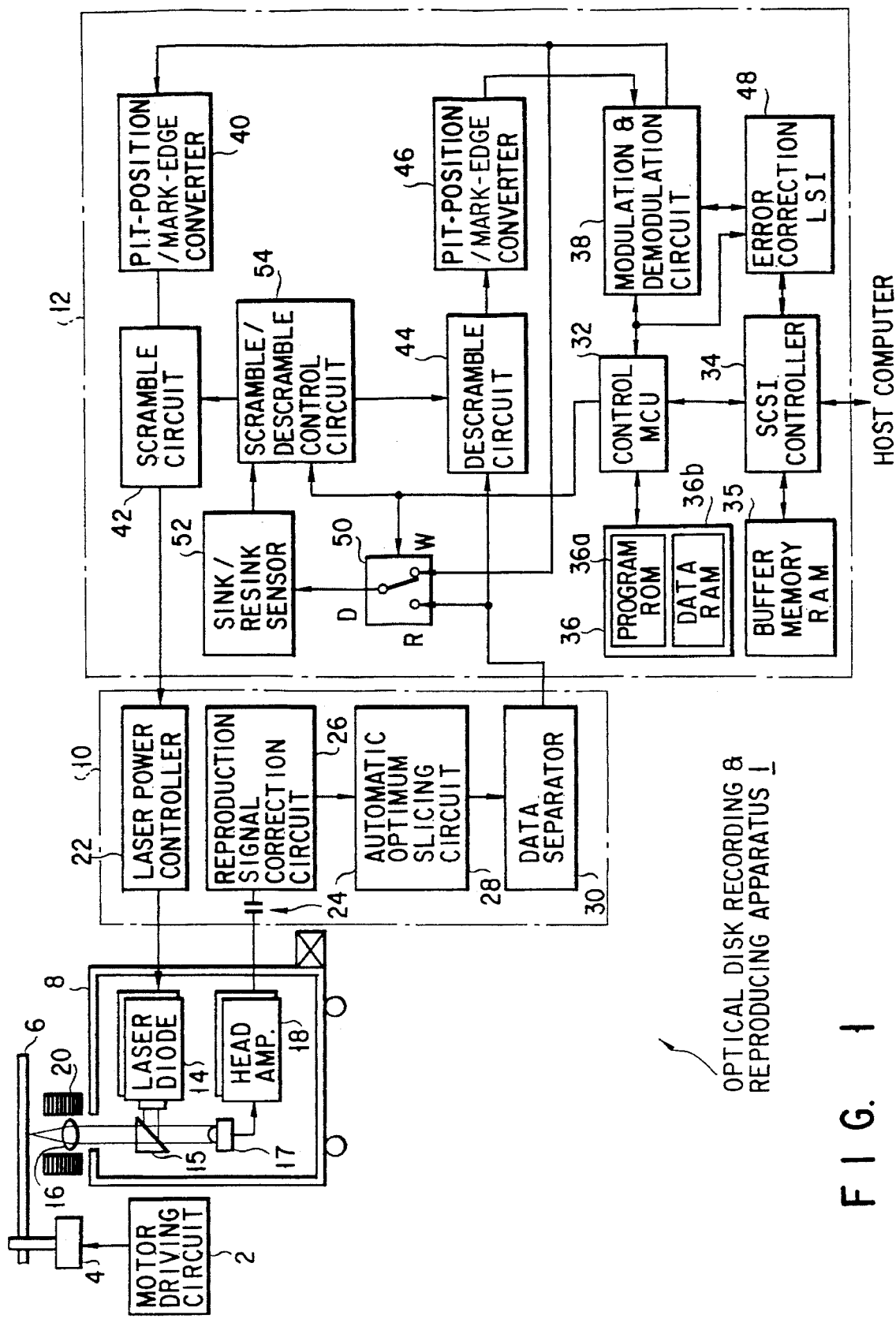
FIG. 1 is a block diagram of an optical disk recording and reproducing apparatus according to a first embodiment of an optical information recording and reproducing apparatus of the present invention.
Figure 4:
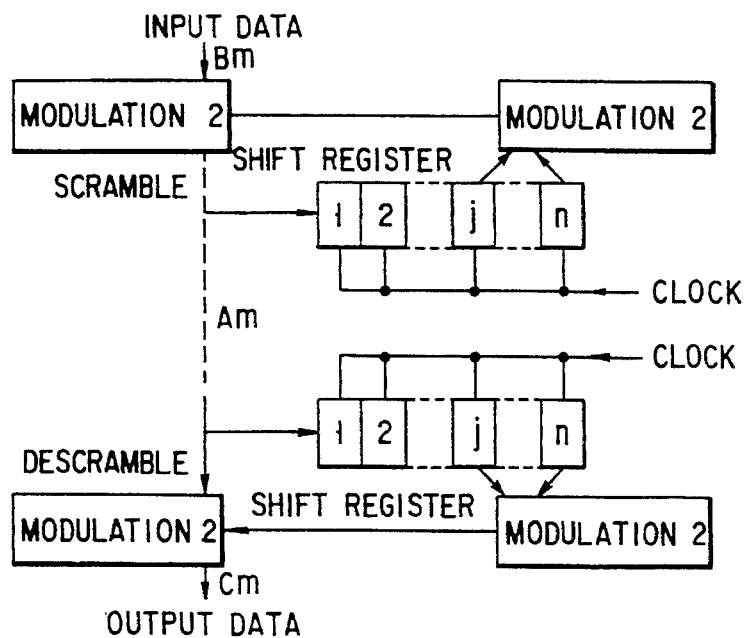
FIG. 4 is a conceptual diagram of the scramble circuit and the descramble circuit of FIG. 1.
Figure 5:
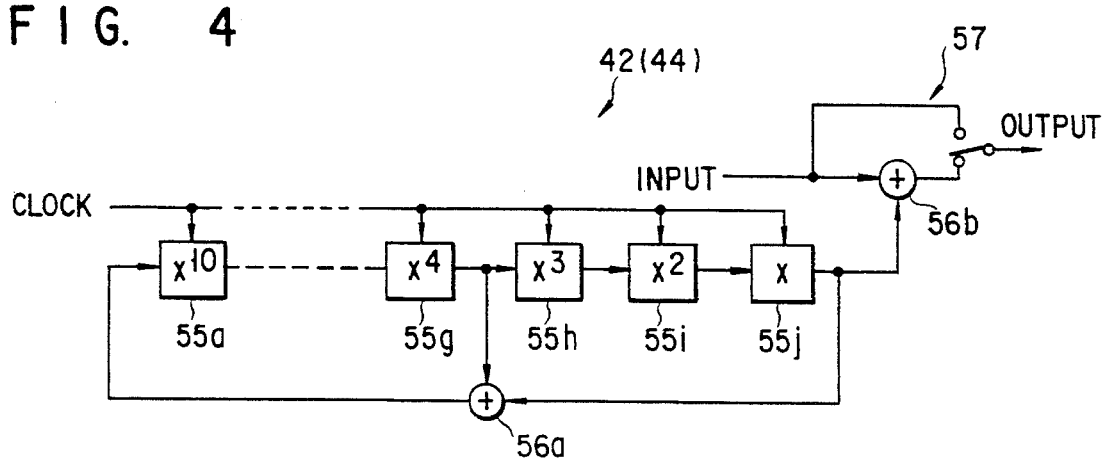
FIG. 5 is a block diagram of the scramble circuit and the descramble circuit of FIG. 1.
Figure 7:
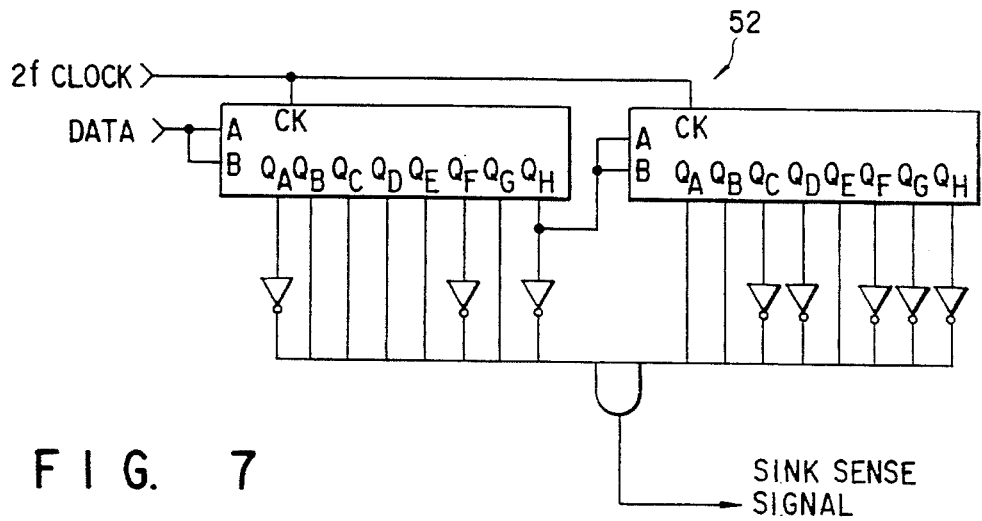
FIG. 7 is a circuit diagram of the sink/resink sensing circuit of FIG. 1.
Figure 9:
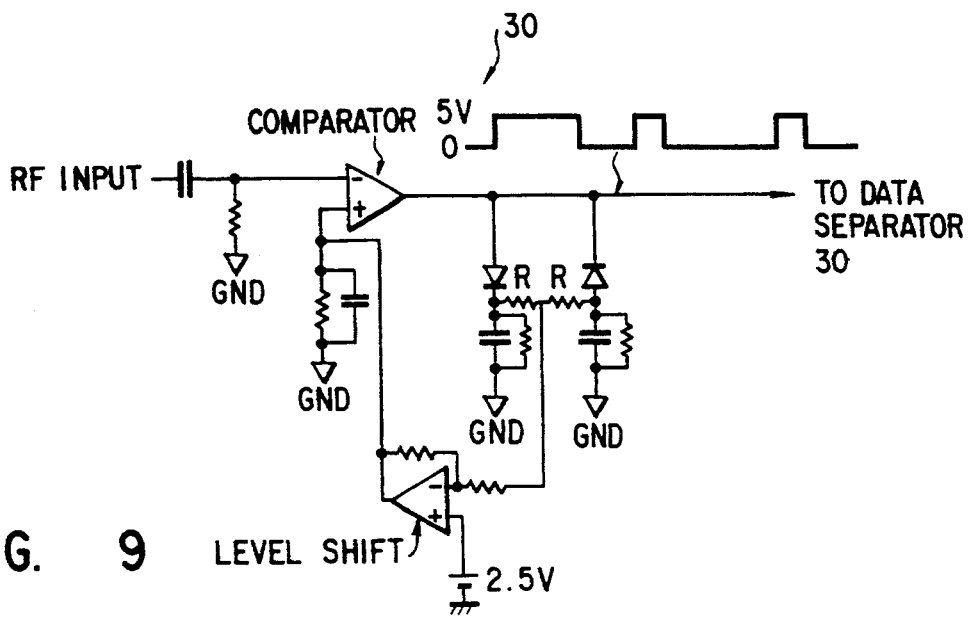
FIG. 9 is a circuit diagram of the automatic optimum level slicing circuit of FIG. 1.
Figure 10:
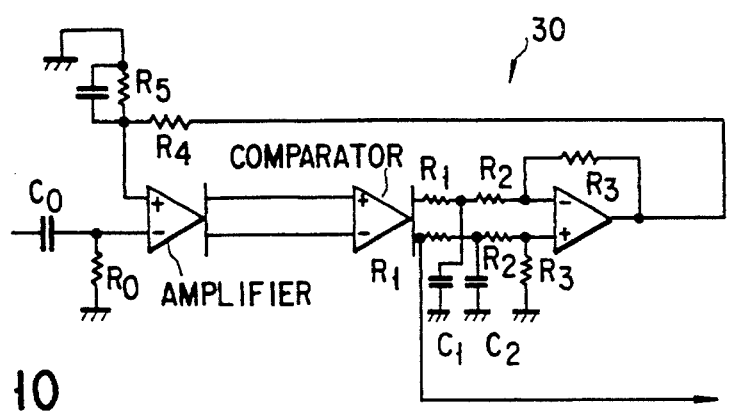
FIG. 10 is a circuit diagram of a modification of the automatic optimum level slicing circuit of FIG. 1.

FIGS. 1 through 10 are related to a first embodiment of the present invention. Specifically, FIG. 1 is a block diagram of an optical-disk recording and reproducing apparatus; FIGS. 2A and 2B are circuit diagrams of the pit-position/mark-edge converting circuit and the mark-edge/pit-position converting circuit of FIG. 1, respectively; FIGS. 3A through 3E are timing charts for explaining the operation of the mark-edge/pit-position converting circuit of FIG. 2; FIG. 4 is a conceptual diagram of the scramble circuit and the descramble circuit of FIG. 1; FIG. 5 is a block diagram of the scramble circuit and the descramble circuit of FIG. 1; FIG. 6 is a circuit diagram of the scramble circuit and the descramble circuit of FIG. 1; FIG. 7 is a circuit diagram of the sink/resink sensing circuit of FIG. 1; FIGS. 8A and 8B are timing charts for explaining the operation of the scramble/descramble control circuit of FIG. 1; FIG. 9 is a circuit diagram of the automatic optimum level slicing circuit of FIG. 1; and FIG. 10 is a circuit diagram of a modification of the automatic optimum level slicing circuit of FIG. 1.

As shown in FIG. 1, the optical-disk recording and reproducing apparatus 1 according to the first embodiment of the present invention records and reproduces information on and from an optical disk 6 conforming to, for example, 130-mm ECMA standardization. The apparatus 1 comprises: an optical head 8 which records and reproduces information by projecting laser light onto the optical disk 6 rotated by a spindle motor 4 actuated by a motor driving circuit 2; a head driving control section 10 which actuates the optical head 8, and a system control section 12 which transfers modulated data to be recorded to the head driving control section 10 and demodulates the data from the reproduced signal from the head driving control section 10.

The optical head 8 gathers the laser light from a laser diode 14 onto the recording surface of the optical disk 6 through an object lens 16 via a beam splitter 15. The laser diode 14 is designed to project recording laser light in a recording operation and reproducing laser light in a reproducing operation. The reflected light of the reproducing laser light from the optical disk 6 passes through the object lens 16 and the beam splitter 15 and is sensed by a detector 17. The sensed light is amplified by a head amplifier 18 to form a reproduction signal. The object lens 16 is designed to be driven by an actuator 20 for a known tracking and focus servo operation.

The head driving control section 10 comprises: a laser power controller 22 which controls the laser power of the laser diode 14; a reproduction signal correction circuit 26 which takes in the reproduction signal from the head amplifier 18 via an AC coupling 24 and makes corrections including waveform shaping; an automatic optimum level slicing circuit 28 which optimizes the slice level according to the output of the reproduction signal correction circuit 26 and converts the input into a logic level signal; and a data separator 30 which extracts the reproduced data synchronized with a specific reproducing clock from the logic level signal from the automatic optimum level slicing circuit 28.

The system control section 12 is provided with a control MCU (multi-control unit) 32, which communicates with an external host computer (not shown) via an SCSI controller 34 with a buffer memory 35 capable of temporarily storing the recorded or reproduced data. The control MCU 32, which is started on the basis of a control program stored in a program ROM 36a of a main memory section 36, creates recording data in the data RAM 36b of the main recording section 36 according to the control program, and stores the reproduced data from the optical disk in the data RAM 36b.

In a recording operation, the recording data created by the control MCU 32 is modulated by a modulation and demodulation circuit 38 into non-DC-free codes, for example, a 2–7 modulation pit-position recording signal. This pit-position recording signal is converted into a mark-edge recording signal by a pit-position/mark-edge converting circuit 40. The mark-edge recording signal is scrambled at a scramble circuit 42 acting as random information generating means and converted into recording data of pseudo DC-free codes, which are then transferred to the laser power controller 22 of the head driving control section 10.

In a reproducing operation, the synchronized reproduction data from the data separator 30 is descrambled at a descramble circuit 44 to produce a mark-edge reproduction signal. This mark-edge reproduction signal is converted into a pit-position reproduction signal by a mark-edge/pit-position converting circuit 46. The pit-position reproduction signal is demodulated by the modulation and demodulation circuit 38. The demodulated signal undergoes error correction at an error correction LSI 48. The control MCU 32 stores this corrected signal as the reproduced data in the data RAM 36b.

The scramble circuit 42 and the descramble circuit 44 are required to operate with the data area from which the VFO section, the sink section and the resink section on the optical disk 6 are excluded. In the present embodiment, to control the timing, the system control section 12 is provided with a switch 50 which selects the pit-position recording signal from the modulation and demodulation circuit 38 in a write operation and the synchronized reproduction data from the data separator 30 in a read operation under the control of the control MCU 32, and a sink/resink sensing circuit 52 which senses a sink byte or a resink byte from the pit-position data or the synchronized reproduction data. The scramble/descramble control circuit 54 generates a timing signal from the sink byte or the resink byte sensed at the sink/resink sensing circuit 52, the timing signal causing the scramble circuit 42 to operate in a write operation and the descramble circuit 44 to operate in a read operation for a certain period of time in order to scramble or descramble the data area from which the VFO section, the sink section, and the resink section are excluded.

The pit-position/mark-edge converting circuit 40 can be composed of a flip-flop 40a as shown in FIG. 2A. After the flip-flop 40a has been reset by a reset signal (RESET) from the control MCU 32, the pit-position recording signal is supplied to a clock terminal (CK) and the inverted output is supplied to an input terminal (D). This causes the output of an output terminal (Q) to be inverted each time the pit-position recording signal is supplied, thereby producing a mark-edge recording signal.

As shown in FIG. 2B, the mark-edge/pit-position converting circuit 46 can be made up of two flip-flops 46a and 46b and an exclusive OR gate 46c. As shown in FIGS. 2B and 3, the clock terminals (CKs) of the two flip-flops 46a and 46b are supplied with a 2f clock acting as a synchronizing clock (f is a data transfer clock). In the flip-flop 46a, the mark-edge reproduction signal (FIG. 3A) is latched with a 2f clock (FIG. 3B) (output a: FIG. 3C). In the flip-flop 46 in a subsequent stage, the mark-edge reproduction signal is latched with a delay of a period of 2f clock (output b: FIG. 3D). By XORing output a and output b with the exclusive-OR gate 46c, a pit-position reproduction signal (FIG. 3E) can be obtained.

The scramble circuit 42 and the descramble circuit 44 are each basically composed of an n-stage shift register with feedback from the mth stage. The scrambled data sequence is expressed by the equation:

$$Am = (Bm@Am-j@Am-n)$$

where @ indicates addition in mode 2 (modulo 2). The descrambled data sequence is expressed by the equation:

$$\begin{aligned} Cm &= (Am@Am-j@Am-n) \\ &= (Bm@Am-j@Am-n@Am-j@Am-n) = Bm \end{aligned}$$

Thus, the output of the descrambling operation is equal to the original sequence.

As shown in a block diagram of the scramble circuit 42 and the descramble circuit 44 in FIG. 5, each of them is composed of ten shift registers 55a through 55j, two adders 56a and 56b, and a switch 57. They produce a scramble signal meeting the following polynomial from the clock:

$$f(X) = X^{10} + X^5 + 1$$

Then, they scramble the input signal using this scramble signal and produces a 10th-degree M-system PN signal. Here, the adders 56a and 56b add two inputs in mode 2 (modulo 2), giving the results shown in the table below:

| Input | | Output |
|---|---|---|
| A | B | C |
| 0 | 0 | 0 |
| 0 | 1 | 1 |
| 1 | 0 | 1 |
| 1 | 1 | 0 |

As shown in a circuit diagram of the scramble circuit 42 and the descramble circuit 44 in FIG. 6, each of them is made up of a random data generator 60 composed of 10 shift registers, each consisting of a flip-flop 68n and an OR circuit 70n (n=a to j), an exclusive OR gate 62, and a data selector 64. Here, the clock frequency is the same as that of the medium VFO section, that is, 2f/6 for 2–7 modulation and 2f/4 for 1–7 modulation (f is a data transfer clock). A SET signal goes high (Hi) immediately before the transfer of the data following the sink or the resink, to reset the outputs Qs of all flip-flops 68n (n=a to j).

The random data generator 60 may be composed of a memory circuit such as a ROM that has stored specified random data previously. It may read the random data in a scrambling or a descrambling operation, and then scramble or descramble the input data using the random data.

with the circuit configuration as shown in FIG. 7, when, for example, the sink pattern (or the resink pattern) is "0001001101011110", the sink/resink sensing circuit 52, acting as synchronizing sensing means, can sense the sink pattern (or the resink pattern). On the basis of this sink sense signal, the scramble/descramble control circuit 54 generates a scramble control signal (or a descramble control signal) shown in FIG. 8B for the data area according to the data format of the optical disk 6 shown in FIG. 8A, and then controls the operation of the scramble circuit 42 (or the descramble circuit 44).

A circuit diagram of the automatic optimum level slicing circuit 28 is shown in FIG. 9, and another circuit diagram of the slicing circuit is shown in FIG. 10. Since in the embodiment where pseudo DC-free codes and information mark-edge recorded are reproduced with the automatic optimum level slicing circuit 28, the average distance between 0 outputs and that between 1 outputs of a comparator that compares with a specified slice level are equal, the specified slice level can always be controlled, thereby making it possible to shape the waveform of a logic level signal with the optimum slice level.

The optical disk 6 consists of such a disk as a postscript-type optical disk, a phase-change-type optical disk, or a magneto-optical disk.

As described above, with the optical-disk recording and reproducing apparatus according to the first embodiment of the present invention, pseudo DC-free codes can be produced in a modulation method using non-DC-free codes such as those in 2–7 or 1–7 modulation, thereby recording information on an optical disk using a mark-edge recording method suitable for high recording density. In addition, a level slice method that does not amplify high-frequency components unlike a second-order differential method, can be used as a reproduction method. Consequently, it is possible to record and reproduce information accurately.

Since in automatic optimum level slicing in the embodiment that realizes the above level slicing method, the specified slice level is always controlled, it is possible to correct the deviation of conditions in recording (in optical modulation recording, the deviation of the recording domain due to a change in the optimum light power and in the medium sensitivity, and in magnetic field modulation, the deviation of the recording domain due to a change in the recording magnetic field intensity and the medium sensitivity).

Further, with the optical-disk recording and reproducing apparatus of this embodiment, 2–7 or 1–7 modulation data is scrambled or descrambled for mark-edge recording, thereby enabling the effective use of a circuit used in a conventional optical-disk recording and reproducing apparatus which provides pit-position recording by 2–7 or 1–7 modulation. This makes the apparatus of the embodiment compatible with conventional apparatuses, thereby lowering manufacturing costs.

As explained above, with the optical information recording and reproducing apparatus of the first embodiment, since non-DC-free code information is XORed with random information to produce recording information, and mark-edge recording the recording information in the recording area of an optical information recording medium on the basis of synchronizing information, this enables the recording information to be converted into pseudo DC-free codes, thereby making it possible to record and reproduce information at high density.

Hereinafter, a second embodiment of the present invention will be described. In this embodiment, pseudo DC-free codes generated by the method of the first embodiment, or almost DC-free codes, are written onto a recording medium in a formatting operation or/and an erasing operation.

FIGS. 12 through 15 are related to a second embodiment of the present invention. FIG. 12 is a schematic diagram of a magneto-optical disk apparatus of the second embodiment; FIG. 13 is a circuit diagram of the edge sensing circuit of FIG. 12; FIG. 14 shows the signal waveform of each portion in FIG. 13; and FIG. 15 is a flowchart for the operation of the second embodiment.

As shown in FIG. 12, in a magneto-optical disk apparatus 101 of the second embodiment, a magneto-optical pickup (hereinafter, referred to as a pickup) 104 is positioned so as to face one surface of a magneto-optical disk 103 rotated by a spindle motor 102 at a specified rotational speed, and a bias magnetic field generating section 105 is located so as to face the other surface of the disk 103. The magneto-optical disk 103 is a recording medium allowing the rewriting of the recorded information. Information can be recorded on, reproduced from, and erased from the disk 103 with the pickup 104.

A laser diode (LD) 106 is housed in the pickup 104. The laser light generated by the laser diode 106 is gathered through a beam splitter, etc. (not shown) and through an object lens 107 and projected onto (the vertical magnetization film via the transparent substrate of) the magneto-optical disk 103 to form a very small light spot.

The reflected light from the vertical magnetization film returns along an incident light path and directed by the beam splitter to the direction different from that of the incident light path. This light is then received by an optical sensor 108. This optical sensor is provided with a pair of photodiodes 108a and 108b (see FIG. 13) to sense the information signal recorded on the vertical magnetization film. The optical sensor 108 also senses a control signal for focusing and tracking. The output signal from the optical sensor 108 is supplied to a reproduction signal processing section 109, which performs signal processes including binarization and modulation, and supplies the resulting signal via a CPU 111 to an external controller 112 such as a personal computer.

In a recording operation, the recording information sent from the external controller 112 is subjected to signal processing such as modulation at a recording (erasing) signal processing section 113. The processed signal is supplied to the laser diode 106, which then emits modulated light according to the recording information. At the same time, the bias magnetic field generating section 105 applies a recording magnetic field of a certain direction to the magneto-optical disk 103 to record information.

The bias magnetic field generating section 105, which is made up of, for example, an electromagnet, generates a recording magnetic field of a certain direction, depending on the direction of the direct current supplied from the bias magnetic field control section 114 controlled by the CPU 111.

An actuator section 115 and a coarse adjustment section 116 are provided as means for moving a light beam so that a position at which information is recorded or reproduced using a light beam can be changed, and for holding the beam in that place. The object lens 117 is moved a bit by the actuator section 115 across the tracks on the magneto-optical disk 103. The coarse adjustment section 116, which is composed of moving means such as a voice coil motor, can move the pickup 104 over the entire track area.

The actuator section 115 and the coarse adjustment section 116 are controlled by the instruct signal from a beam position control section 117. The beam position control section 117 is controlled by the CPU 111.

In an erasing operation, the bias magnetic field control section 114 supplies to the bias magnetic field generating section 105 a direct current whose direction is opposite to that of current used in generating a recording magnetic field, and applies to the magneto-optical disk 103 an erasing magnetic field whose direction is opposite to that of the recording magnetic field. Then, the laser diode 106 emits laser light whose level is almost the same as that in a recording operation.

In the present invention, when an unformatted magneto-optical disk 103 is inserted in the magneto-optical disk apparatus 101, formatting is effected in an initialization process by recording a specific pattern in (all the sectors in) all the tracks in the data area of the user area. After normal formatting, a specific pattern may be written in all the sectors in all the tracks in the data area of the user area.

To do this, the CPU 111 supplies a specific pattern signal to the recording (erasing) signal processing section 113. The specific pattern to be recorded is, for example, a periodic pattern of the order of several tens of KHz to several MHz.

To minimize the generation of transitional response at a joint connecting user data patterns, the specific pattern is preferably a fully DC-free pattern. However, it is not necessarily a fully DC-free pattern. It is all right that it is an almost DC-free pattern.

While in a conventional apparatus, a DC pattern was written in an erasing operation, the laser diode 106 is modulated using an almost DC-free specific pattern identical with that used in a format operation in the present embodiment.

The almost DC-free specific pattern itself has only to be read from memory means such as a ROM (not shown) connected to the CPU 111.

FIG. 13 shows the arrangement of the edge sensing circuit 121 based on a DC slicing method (of reading optically recorded information on the magneto-optical disk 103) of the reproduction signal processing section 109.

As shown in FIG. 14A, pits are formed in the direction of magnetization in a track. The photoelectric conversion signals from a pair of photodiodes 108a and 108b shown in FIG. 13 are supplied to a differential amplifier 122, which then produces a differential output. This output passes through a CR coupling circuit 123 for eliminating the influence of direct-current components due to double refraction and through a preamplifier 124, and is formed into a reproduced signal SO with a waveform corresponding to the pits as shown in FIG. 14B. The cut-off frequency of the low-frequency side of a filter consisting of capacitor C and resistor R of the CR coupling circuit 123 is set at approximately 1 KHz.

The reproduced signal SO is supplied to a comparator 125, which compares it with slice level vs1 set by the division of resistors R1 and R2, and produces a binarized signal S1 shown in FIG. 14C.

The binarized signal S1 supplied from the comparator 125 is supplied to a data input terminal of a flip-flop circuit 126. The signal S1 from the comparator 125 and the signal S2 of FIG. 14D from the flip-flop circuit 126 are supplied to an exclusive OR circuit (hereinafter, referred to as an E-OR circuit) 127, which produces an output signal S3 of XOR shown in FIG. 14E.

The output signal S3 of the E-OR circuit 127 is supplied to a one-shot multivibrator 128, which produces a short pulse at the rising edge of the output signal S3 from the E-OR circuit 127 and supplies the pulse to the clock input terminal of the flip-flop circuit 126, and which supplies this pulse as the output signal of the edge sensing circuit 121 (see FIG. 14F).

Explained next will be the operation when a magneto-optical disk 103 is inserted in the magneto-optical disk apparatus of the second embodiment, referring to the flowchart of FIG. 15.

When the power supply of the magneto-optical disk apparatus 101 is turned on, it is judged at step St1 whether or not a magneto-optical disk 103 has been inserted in the apparatus 101. Whether or not a magneto-optical disk 103 has been inserted in the apparatus 101 is sensed by, for example, an optical sensor provided in the rear of a disk slot (not shown). On the basis of the sense output, the CPU 111 judges whether or not the disk has been inserted.

If it is judged that the disk 103 has been inserted, the CPU 111 gives a motor driving circuit (not shown) an instruction to rotate the spindle motor 102 and causes the disk 103 to rotate at step St2.

After that the disk 103 is being rotated at a constant rotational speed has been sensed by, for example, a rotation sensor (not shown), the CPU 111 sends a control signal to the beam position control section 117, which then causes the coarse adjustment section 116, etc. to operate to make the pickup 104 access the control track in order to read the information from there, as shown in step St3. The information thus read is transferred to the CPU 111.

At step St4, on the basis of the read-out information, the CPU 111 judges whether or not the disk 103 has been initialized. If it is judged that the disk 103 has not been initialized, at step St5, a specific pattern signal is sent to the recording (erasing) processing section 113, which performs initialization by recording a DC-free pattern in the entire sector area in the data area of the user area.

If it is judged that the disk 103 has been initialized, at step St6, control goes to Step St5 if the user has selected the choice of recording a DC-free pattern at step St6. If the user has not selected the choice of not recording a DC-free pattern, control proceeds to step 5 and the process is terminated without executing step St5.

If the user has selected the choice of recording a DC-free pattern, a DC-free pattern may be recorded in all the sectors except for those in which information has already been recorded in the user area.

In the second embodiment, as seen from the flowchart of FIG. 15, for an uninitialized magneto-optical disk 103, a DC-free pattern is written in all the sectors in the data area of the user area. After this, information is recorded. After information has been recorded, reproduction or erasure is effected.

To record information, a bias magnetic field is applied to a sector in which the information is to be written, in the opposite direction to that in a recording operation, as with conventional apparatuses. Then, high-level light is projected onto the sector to erase the entire sector. After this, a recording bias magnetic field is applied and light is emitted in pulse form at a high level and a low level on the basis of the signal obtained by modulating the information to be recorded, thereby recording information.

If the recording of information has finished in the middle of the sector, a code representing an end may be added (recorded) and a DC-free pattern be written in the portion after the end code to the end of the sector.

To erase the recorded information, the contents of the flag indicating the presence and absence of the directory information as to whether the directory information to manage the recording position of the information is recorded in the sector, may be rewritten as absent (i.e., the information is not recorded in the sector), thereby equivalently erasing the sector in which the information is recorded.

The information in the sector may be actually erased. In this case, like a case where it is judged that the disk 103 is uninitialized, a DC-free pattern is written in the entire sector. In accordance with this erasure, the directory information corresponding to the sector information is also modified.

With the second embodiment, for an uninitialized magneto-optical disk 103, a DC-free pattern is written in all the sectors in the data area of the user area. Thus, when the information in a given sector is reproduced by a DC slicing method with AC coupling set at a relatively low cut-off frequency, the information can be reproduced accurately without causing a transitional response problem, because information is also recorded in the preceding sector (the information exists continuously).

By recording or reproducing information using a magneto-optical disk 103 in which a DC-free pattern is written in all the sectors in the data area of the user area with the apparatus of the second embodiment 103, a transitional response problem can also be alleviated.

While in the second embodiment, a magneto-optical disk 103 has been described, the present invention may be applied to an optical recording apparatus and an optical erasing apparatus which can erase and record information. Therefore, the invention can also be applied to a phase-change type optical recording apparatus and a phase-change optical erasing apparatus in which the reflectivity varies with the phase change. Similarly, a recording medium of the phase change type may be used.

Although in the above embodiment, a DC-free pattern is written in all the sectors in the data area of the user area, a DC-free pattern or an almost DC-free pattern may be written at least at the end of each sector so that a transitional response problem can be practically or sufficiently alleviated between the end of the current sector and the beginning of the following sector.

while in the above explanation, a specific pattern is read from memory means such as a ROM, the pattern signal from a pattern signal generator which is provided in the reproduction apparatus so as to produce a DC-free pattern signal may be used instead.

For example, the pattern signal generator may supply a pattern signal to the comparator 125 until the time is reached when the beginning of the sector in which the information to be reproduced is recorded is read. Then, with the timing that the information on the beginning of a sector is read, the signal from the optical sensor 108 may be supplied to the comparator 125, thereby forming means free from a transitional response problem.

As explained above, with the second embodiment, there is provided means for writing an almost DC-free pattern in all the sectors in the user area on an uninitialized optical information recording medium. Therefore, when the information in a given sector in the medium is reproduced, almost no effect of transitional response occurs because information has been already written in a portion immediately before the sector, thereby enabling reproduction with a DC slicing read circuit set at a relatively low cut-off frequency.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical information recording and reproducing apparatus which, on the basis of non-DC-free information, records information on a recording medium, the recording medium having a synchronization area in which synchronization information is recorded and a recording area for recording information, comprising:

random information generating means for generating predetermined random information;

recording information generating means for generating recording information on the basis of said non-DC-free information and said predetermined random information from said random information generating means;

synchronization sensing means for sensing said synchronization information recorded in said synchronization area;

recording means for recording said recording information from said recording information generating means in said recording area on the basis of said synchronization information sensed by said synchronization sensing means; and reproducing means for reproducing said recording information recorded by said recording means.

2. An optical information recording and reproducing apparatus according to claim 1, further comprising converting means for converting said non-DC-free information into a mark-edge recording signal, wherein said recording means records the mark-edge recording signal on the basis of said synchronization information.

3. An optical information recording and reproducing apparatus according to claim 1, wherein said recording information generating means includes logical operation means for generating recording information by performing logical operation between said non-DC-free information and said predetermined random information from said random information generating means.

4. An optical information recording and reproducing apparatus according to claim 3, wherein Said logical operation means includes exclusive OR means for XORing said non-DC-free information with said predetermined random information.

5. An optical information recording and reproducing apparatus according to claim 1, wherein said random information generating means is composed of a shift register including a flip-flop and an OR circuit.

6. An optical information recording and reproducing apparatus according to claim 1, wherein said reproducing means includes a binarization signal generating means for reproducing said recording information recorded by said recording means, comparing the reproduced signal with a reference level, and generating a binarization signal, and a reference level setting means for setting said reference level so that the average section length for each of a first and a second value of the binarization signal is almost equal.

7. An optical information recording and reproducing apparatus according to claim 1, wherein said recording information is a pseudo DC-free code and said recording means includes writing means for writing said pseudo DC-free code in at least a portion of the user area during at least either the formatting of said recording medium or the erasing of data.

8. An optical information reproducing apparatus which reproduces information from a recording medium having a synchronization area in which synchronization information is recorded and a recording area in which recording information generated on the basis of non-DC-free information and predetermined random information is recorded, comprising:

reproducing means for reproducing said recording information recorded in said recording area;

reproduction information generating means for generating said recorded information responsive to said recording information and said predetermined random information;

said reproducing means includes a binarization signal generating means for reproducing said recording information, by comparing the reproduced signal with a reference level, and generating a binarization signal, and reference level setting means for setting said reference level so that the average section length for each of a first and second value of the binarization signal is almost equal.

* * * * *